March 6, 1928.

B. M. W. HANSON

GAUGE

Filed June 17, 1925

1,661,722

Inventor

Bengt M. W. Hanson

By T. Clay Lindsey his Attorney

Patented Mar. 6, 1928.

1,661,722

UNITED STATES PATENT OFFICE.

BENGT M. W. HANSON, OF HARTFORD, CONNECTICUT; EINAR A. HANSON AND CLARENCE E. WHITNEY, EXECUTORS OF SAID BENGT M. W. HANSON, DECEASED.

GAUGE.

Application filed June 17, 1925. Serial No. 37,852.

This invention relates to gauges, and the features thereof find peculiar applicability in gauges for use in determining the diameter of externally threaded members, the threaded portions of which are relatively short.

The aim of the invention is to provide a gauge having various features of novelty and advantage and, more particularly, to provide a device of this sort with which relatively thin externally threaded members, such as externally threaded disks, washers, rings or bezels may be very readily and accurately gauged within predetermined limits of tolerance.

In the accompanying drawings, I have shown one of the many embodiments which the present invention may take, but it is to be understood that the present disclosure is by way of illustration only, and the invention is susceptible of various changes, modifications and applications.

Figure 1:
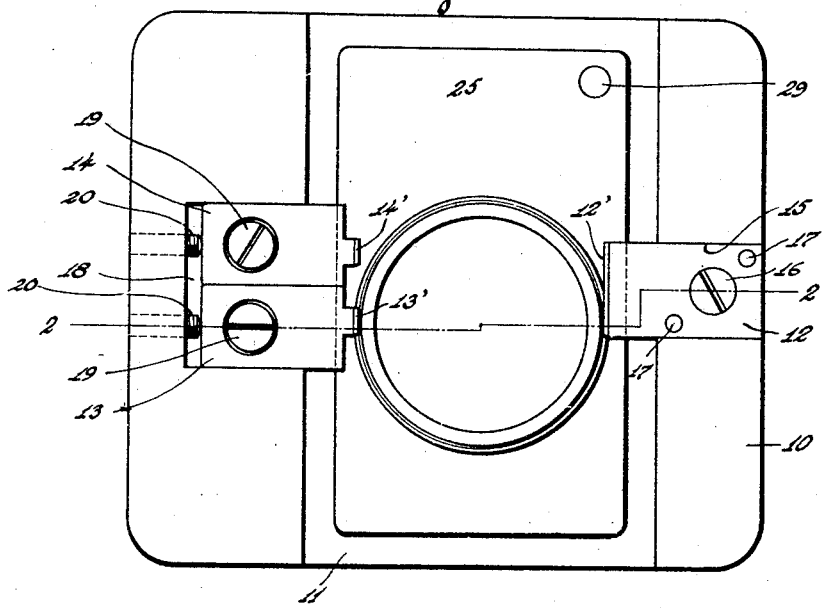
Figure 1 is a top plan view.

Referring to the drawings in detail, the device may include a frame, base or holder 10 of any suitable construction and shape. In the present instance, this base comprises a block having a longitudinally extending groove or channel 11. Positioned on the top of the block to opposite sides of the channel are jaws, one of which, in the present instance, comprises a single member 12, and the other of which comprises a pair of members or sections 13 and 14 positioned one back of the other. The opposed faces of the jaws are provided with teeth or serrations which are generally similar in transverse section to the groove of the thread to be gauged and, preferably, the serrations on each jaw face are parallel to each other, but the serrations of one jaw are oppositely inclined laterally to those of the other jaw in accordance with the angle between diametrically opposite portions of the threads to be gauged so that the threads and the serrations at their points of contact extend in the same direction. In my Patent No. 1,489,575 issued April 8, 1924, for gauge, I disclose opposed jaw faces generally similar to those shown in the accompanying drawings. The serrations of the jaw member 12 are designated by the numeral 12', and those of the sections 13 and 14 by the numerals 13' and 14', respectively. The jaw member 12 may be positioned in a recess 15 in the upper face of the block or base 10 and may be held in place by a screw 16 and dowels 17. The sections 13 and 14 may be located in a recess 18 of the block 10 and may be secured in place by screws 19. Preferably, the openings in the sections 13 and 14 which receive the screws 19 are larger than those screws so as to permit of adjustment of the jaw sections 13 and 14 relative to the other jaw 12. The sections 13 and 14 may be adjusted in any suitable manner as by means of screws 20 threaded into the block 10 and engaging the rear ends of the jaw sections 13 and 14.

One difficulty which has been experienced in gauging members having a thread of a relatively few number of turns or relatively thin externally threaded disks or rings is that of bringing the pieces of work into proper relation to the gauging members and holding the work in that position during the gauging operation. It has been found that, if the piece of work is held in the hand of the operator while being brought into engagement with the jaws, the work not infrequently is canted and, if gauged in this canted position, the determinations will be incorrect; and also difficulty has been experienced in properly matching the threads on the work with the gauging points or serrations of the jaw members. To overcome this and other objections, I provide, in accordance with the present invention, a support for the work by means of which the work will be held in proper position and against canting while the work is brought into engagement with the gauging members and during the gauging operation. In the present illustrative disclosure, this support is in the form of a table 25 positioned within the groove 11 of the block 10. The support has a central stem 26 mounted for vertical sliding movement in an opening 27 in the block 10. About the stem 26 and between the block 10 and the support 25 is a spring 28 which normally urges the table upwardly, this upward movement being limited by the overhanging jaw members, as clearly shown in the drawings. For the purpose of preventing the support from turning in a horizontal plane, the support may have a depending pin 29 slidably engaging in an opening 30 of the block 10.

Figure 2:
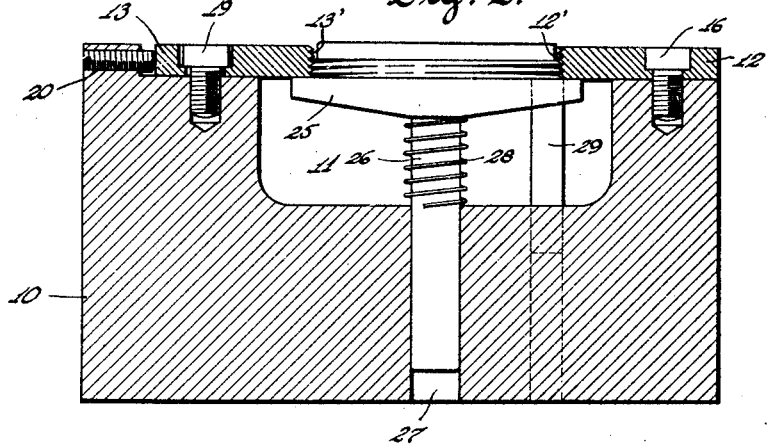
Fig. 2 is a vertical transverse sectional view taken substantially on line 2—2 of Fig. 1.

To set up the device for gauging the pieces of a particular job, the jaw members 13 and 14 are adjusted relative to the opposed jaw 12 so that pieces of work within the given tolerances may be moved past the serrations 13′ but will not move or "go" past the serrations 14′. After the gauge is set up, the operator successively places the pieces of work on the table and then slides the same forwardly between the jaws, and those pieces which will "go" past the serrations 13′ and "not go" past the serrations 14′ are acceptable, and all others are either too small or too large, as the case may be. It will be seen that the support 25, during the gauging operation, holds the pieces of work at the proper angle insuring that the pieces of work cannot become canted. In the event that the threads of a piece of work on the support, when the latter is in its uppermost position shown in Fig. 2, do not correctly match with the serrations of the jaws, the operator will press down slightly on the piece of work, thereby depressing the table against the force of the spring 28 sufficiently to bring the piece of work into the correct horizontal plane where it may be moved between the jaw members. It will thus be seen that, by employing a gauge embodying the features of the present invention, the pieces of work may be measured with the greatest facility and without the requirement of special skill on the part of the operator.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A gauge comprising opposed gauging members one at least of which has a plurality of spaced apart gauging teeth, a support for holding the pieces while moving the same into engagement with and between said gauging members, said support being mounted for movement in the direction in which said teeth are spaced apart, and means for urging said support towards said gauging members.

2. A gauge provided with a pair of opposed jaw faces having a plurality of serrations, and resilient means having a surface extending substantially parallel to said serrations for supporting the threaded members to be gauged while moving the same into engagement with and between said jaw faces.

3. A gauge provided with a pair of opposed jaw faces each having a plurality of serrations, the serrations of one face being inclined to those of the other in accordance with the angle between diametrically opposite portions of a thread to be gauged, and means having a surface extending substantially parallel to said serrations and adapted to support the pieces to be gauged during the gauging operation.

4. A gauge comprising gauging members having opposed gauging faces each having a plurality of serrations, and a table having a surface in parallelism with the line on which the pieces to be gauged are moved between said gauging members, said table being movable towards and away from said gauging members.

5. A gauge comprising a base, gauging members on said base and having opposed gauging faces provided with a plurality of serrations, a table mounted for movement on said base and beneath said gauging members, and a spring normally urging said table upwardly into engagement with the under sides of said gauging members.

6. A gauge provided with a pair of opposed jaws each having a plurality of serrations, one of said jaws comprising a plurality of sections one behind the other, means for adjusting said sections relative to the other jaw, and means having a surface extending substantially parallel to said serrations and adapted to support the pieces to be gauged during the gauging operation.

BENGT M. W. HANSON.